United States Patent [19]
Liao

[11] Patent Number: 5,515,744
[45] Date of Patent: May 14, 1996

[54] ADJUSTABLE STEM MEMBER

[75] Inventor: Jim Liao, Taipei Hsien, Taiwan

[73] Assignee: Hsin Lung Accessories Co., Ltd., Taiwan

[21] Appl. No.: 369,480

[22] Filed: Jan. 6, 1995

[51] Int. Cl.$^6$ ..................................... B62K 21/16
[52] U.S. Cl. ........................... 74/551.3; 403/97; 403/373
[58] Field of Search .................. 74/551.3, 551.1, 74/551.2, 551.8, 551.4, 551.5, 551.6, 551.7; 280/279, 280, 281.1; 403/96, 92, 97, 93, 101, 87, 91, 98, 88, 103, 374, 373

[56] References Cited

U.S. PATENT DOCUMENTS

| | | | |
|---|---|---|---|
| 657,290 | 9/1900 | Landis | 74/551.5 |
| 908,177 | 12/1908 | Watters | 403/93 |
| 921,457 | 5/1909 | Purdum | 403/93 X |
| 2,621,094 | 12/1952 | Brown | 403/373 |
| 3,361,455 | 1/1968 | Hussey et al. | 74/551.6 X |
| 3,388,612 | 6/1968 | Oakley et al. | 74/551.4 |
| 5,327,798 | 7/1994 | Lerch | 74/551.4 X |

FOREIGN PATENT DOCUMENTS

| | | | |
|---|---|---|---|
| 1101558 | 10/1955 | France | 74/551.1 |
| 253155 | 11/1948 | Switzerland | 74/551.1 |

*Primary Examiner*—Rodney H. Bonck
*Assistant Examiner*—Saul Rodriguez
*Attorney, Agent, or Firm*—Andrus, Sceales, Starke & Sawall

[57] ABSTRACT

An adjustable stem member comprises a vertical tube having a projected portion at one end thereof and a horizontal tube to be rotatably pivoted to the projected portion through a connecting mechanism at one end thereof. The connecting mechanism includes two tubular walls, an end wall and a space defined by the tubular walls and the end wall. A lower locking mechanism includes an upper locking block, a locking block and a bolt. The locking blocks are suitably disposed within the space. When the horizontal tube is adjusted to a suitable angle, the locking blocks are forced to press the end wall of the horizontal tube and the projected portion of the vertical tube.

5 Claims, 4 Drawing Sheets

ADJUSTABLE STEM MEMBER

BACKGROUND OF THE INVENTION

This invention relates to a stem member, more particularly, to an adjustable stem member of a bicycle which can be readily arranged to a suitable angle to facilitate a comfortable ride.

As shown in FIG. 1, the conventional stem member includes a vertical tube 2 to be connected with the fork member (not shown in FIG. 1) and a horizontal tube 1 attached to the top end of the vertical tube 2. It can be readily appreciated that the angle defined by the vertical tube 2 and the horizontal tube 1 is fixed, that is, it can not be adjusted. This would pose inconvenience and difficulties to a rider who is either of a quite large or of a small body size.

SUMMARY OF THE INVENTION

It is therefore the object of this invention to provide a stem member having an angular adjusting mechanism to facilitate an adjustment of the stem member to meet the need of a rider of different sizes.

SUMMARY OF THE INVENTION

It is the object of this invention to provide an angular adjusting mechanism suitable for the stem member of a bicycle and which may meet the requirements of riders with different body sizes.

In order to achieve the object set forth above, the stem member made according to the present invention comprises a vertical tube having a projected portion at one end thereof and a horizontal tube to be rotatably pivoted to said projected portion through a connecting mechanism at one end thereof. Said connecting mechanism includes two tubular walls, an end wall and a space defined by said tubular walls and said end wall. A locking mechanism includes an upper locking block, a lower locking block and a bolt. Said locking blocks are suitably disposed within said space. When said horizontal tube is adjusted to a suitable angle, said locking blocks are forced to press the end wall of said horizontal tube and said projected portion of said vertical tube.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of the stem member of the present invention. In the drawings.

DETAILED DESCRIPTION OF PREFERRED EMBODIMENT

Figure 1:
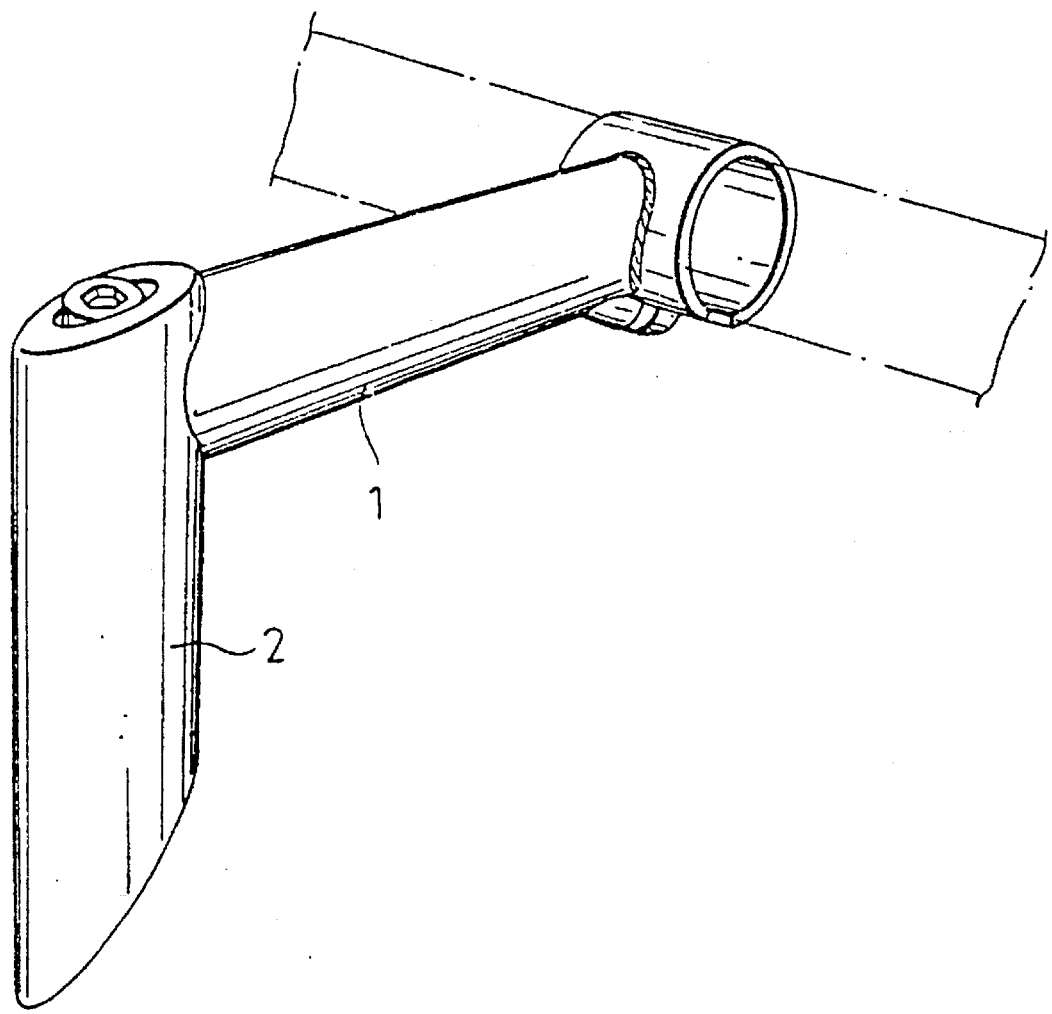
FIG. 1 is a perspective view of a conventional vertical tube.
Figure 2:
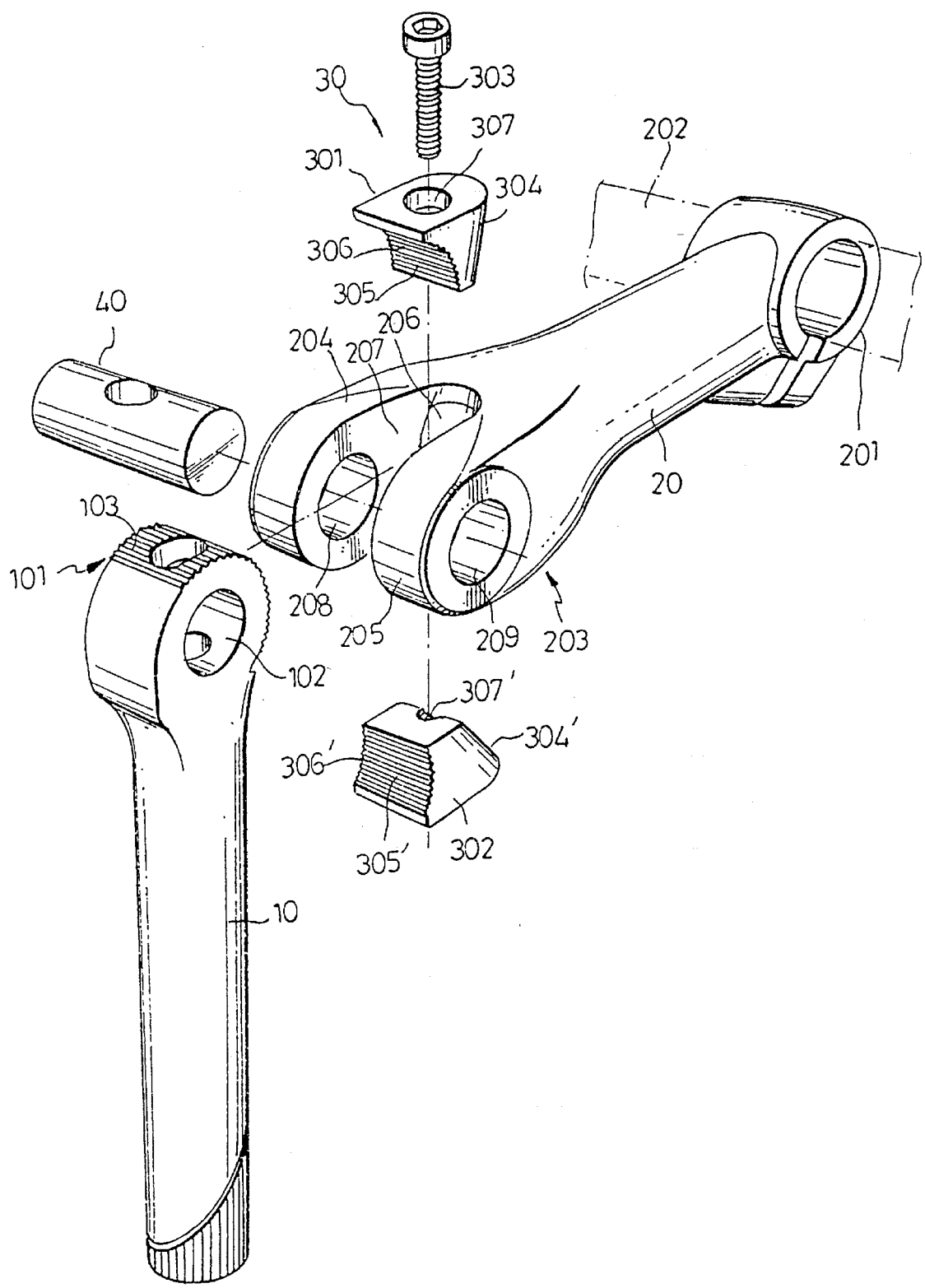
FIG. 2 is an exploded perspective view showing the stem member of the present invention.
Figure 3:
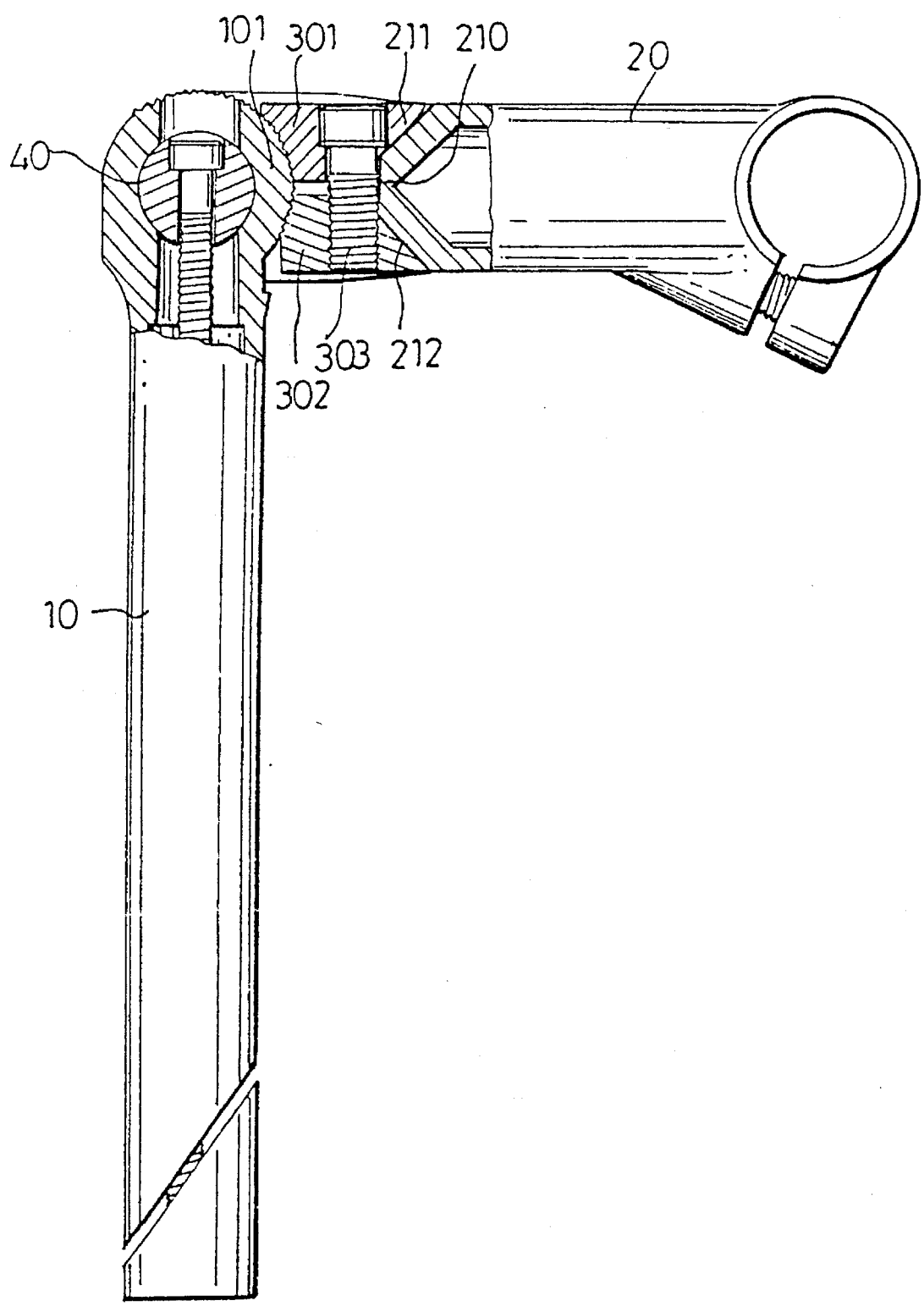
FIG. 3 is a sketched view of an assembled stem member according to the present invention.

Referring to FIGS. 2 and 3, the stem member made according to the present invention comprises a vertical tube 10, a horizontal tube 20 and a locking mechanism 30.

Said vertical tube 10 has a projected portion 101 at one end thereof. Said projected portion 101 has a through hole 102 perpendicular to the length of said vertical tube 10. Said projected portion is arranged with a plurality of ridges 103 to provide an interference fit.

Said horizontal tube 20 has a clip 201 at the front end thereof for receiving and locking the handlebar 202. The distal end of said horizontal tube 20 is provided with a connecting mechanism 203. Said connecting mechanism 203 includes two tubular walls 204, 205, an end wall 206. A space 207 is defined by said tubular walls 204, 205 and said end wall 206. Each of said tubular walls 204 and 205 is provided with a hole 208 (209) which is aligned with the hole 102 of the projected portion 101 of the vertical tube 10. Said end wall 206 is further provided with a tapered upper surface 211 and lower surface 212 centered on the central portion 210 respectively.

Said locking mechanism 30 includes an upper locking block 301, a lower locking block 302 and a bolt 303. Said locking blocks 301, 302 are suitably disposed within said space 207. Said locking blocks 301, 302 have a symmetrical configuration. Accordingly, only the configuration of the one upper locking block 301 will be explained herein. Said upper locking block 301 is arranged with an inclined surface 304 in alignment with said upper tapered surface 211. The other end of said inclined surface 304 is arranged with a recess 305. Said recess 305 is provided with a plurality of traverse ridges 306. The upper locking block 301 is provided with hole 307 and the lower locking block 302 is provided with a threaded hole 307'.

When the holes 208, 209 of said horizontal tube 20 are in alignment with the hole 102, a post 40 is inserted into said three holes and serves as a pivoting point. Accordingly, said horizontal tube 20 is capable of moving upward and downward. As mentioned above, said upper and lower locking blocks 301, 302 are disposed within said space 207 in such a manner that said inclined surface 304 (304') is pressed against said tapered surface 211, 212 respectively, and said projected portion 101 is received by said recess 305 (305'). Subsequently, the bolt 303 is inserted into said hole 307 and is screwed into said threaded hole 307', but not too tightly. In this position, the horizontal tube 20 can be adjusted to an appropriate position, and then the bolt 303 can be locked tightly to urge the upper and lower locking blocks 301, 302 to move inwardly and press against said upper and lower tapered surfaces 211, 212, while the recess 305 (305') is engaged by said projected portion 101. Because the ridges 103, 306 (306') form an interference fit, the position can be maintained securely and firmly.

Figure 4:
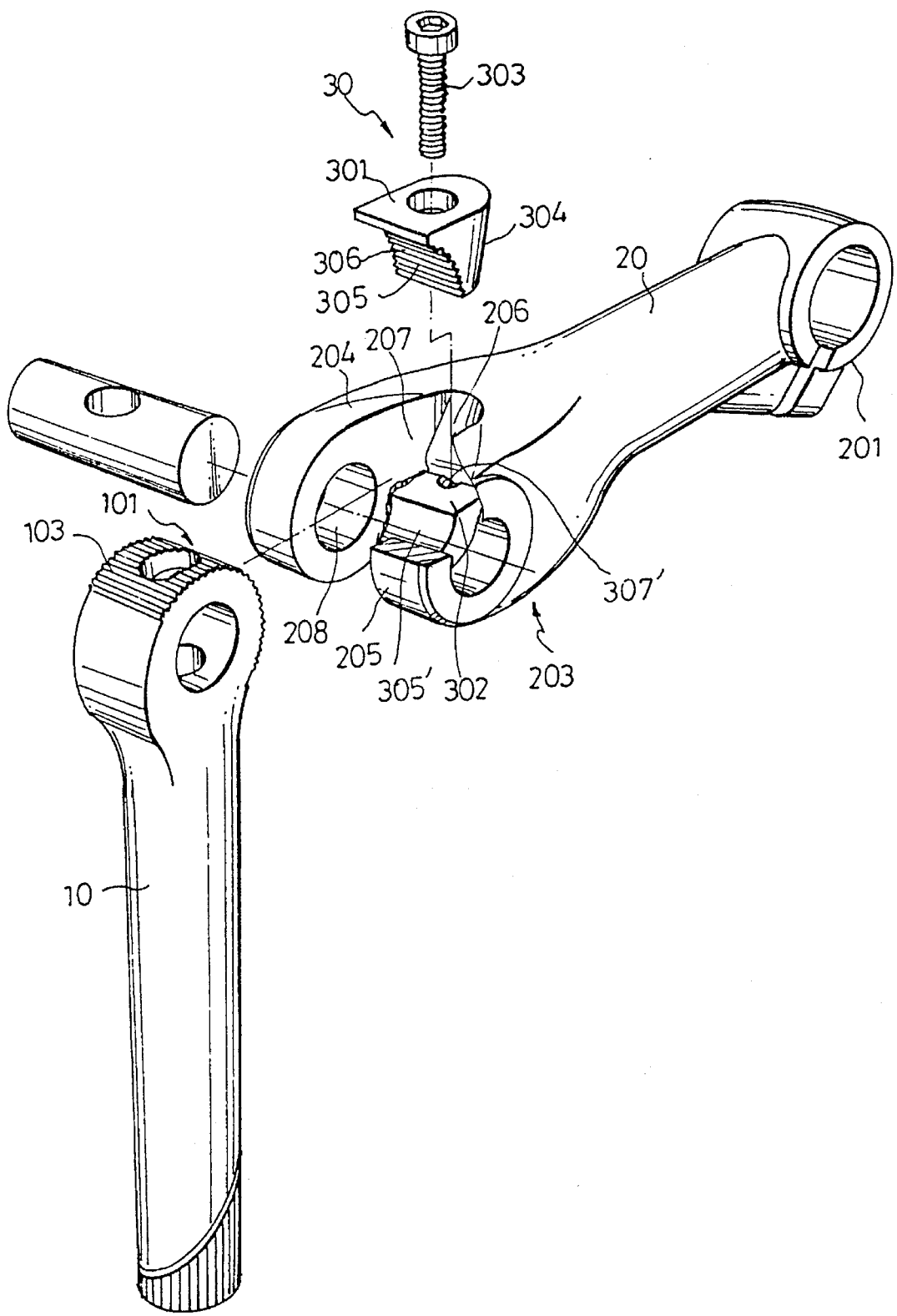
FIG. 4 is an exploded perspective view of another embodiment of the stem member made according to the present invention.

Referring to FIG. 4, another embodiment of the present invention is shown, wherein the lower locking block 302 can be disposed integrally in said horizontal tube 20 and arranged within said space 207. On the other hand, the ridges 306' can be arranged away from said ridges 103 (the ridges 306' can be eliminated). In this case, when the horizontal tube 20 is adjusted to a suitable angle, the upper locking block 301 can be inserted into said space 207 and locked by said bolt 303.

Although the present invention has been described in connection with the preferred embodiment thereof, many other variations and modifications will now become apparent to those skilled in the art without departing from the scope of the invention. It is preferred, therefore, that the present invention not be limited by the specific disclosure herein, but only by the appended claims.

I claim:

1. An adjustable stem member for a bicycle comprising:

a tube that is generally vertical in use having one end suitable for insertion in a frame of the bicycle and having a projected portion at the other end thereof;

a tube that is generally horizontal in use having one end suitable for receiving a handle bar of the bicycle, said horizontal tube being adapted to be rotatably pivoted to said projected portion through a connecting mechanism at the other end thereof, said connecting mechanism including two, spaced, side walls embracing said projected portion of said vertical tube, and an end wall between said side walls that-is spaced from said projected portion when same is embraced by said side walls, said end wall slanting toward said projected portion; and a locking mechanism including an upper locking block and a lower locking block, said locking blocks being disposed between said side walls and between said projected portion and said end wall, said locking blocks having locking surfaces for engaging said projected portion and inclined surfaces for engaging said slanting end wall, said locking mechanism further including a bolt extending through one of said locking blocks and engaging the other of the locking blocks for drawing said blocks together, said locking blocks, when drawn together by said bolt, bringing said inclined surfaces into contact with said slanting end wall to move said locking blocks in a direction generally along said horizontal tube to bring said locking surfaces into engagement with said projected portion to lock said horizontal tube at the desired angle.

2. The adjustable stem member according to claim 1 wherein said locking surfaces of said locking blocks have locking means engageable with locking means on said projected portion for locking said horizontal tube at the desired angle.

3. The adjustable stem member according to claim 2 wherein said locking means comprise interlocking ridges on at least one of said locking blocks and on said projected portion.

4. The adjustable stem member according to claim 1 further including a pin extending through said side walls and said projected portion for pivotally mounting said horizontal tube on said vertical tube.

5. An adjustable stem member according to claim 1 wherein said upper locking block is provided with a hole through which said bolt extends and said lower locking block is provided with a threaded hole for engaging said bolt.

* * * * *